Dec. 1, 1953 — E. S. DUNNING — 2,660,731
SCARF FASTENER
Filed Feb. 6, 1950
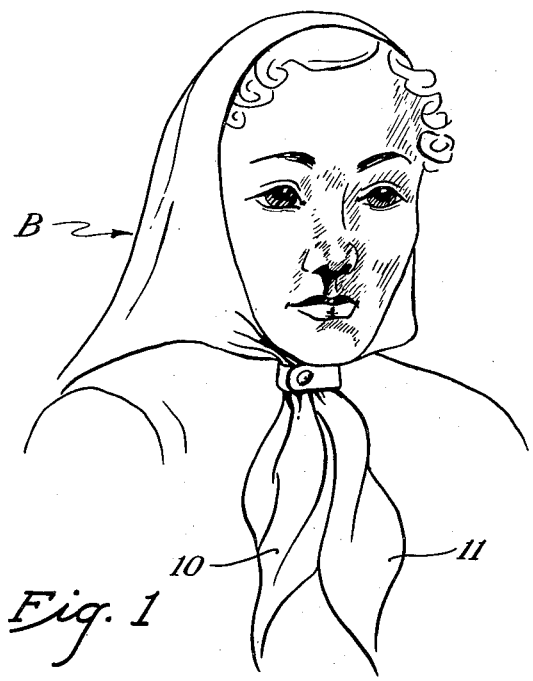
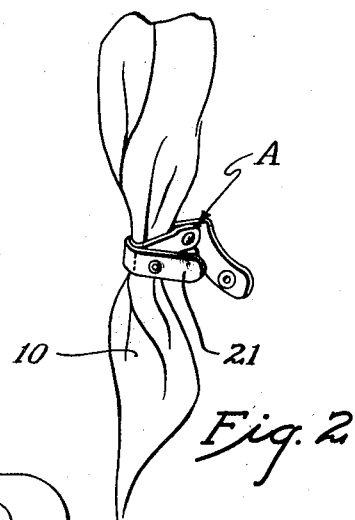
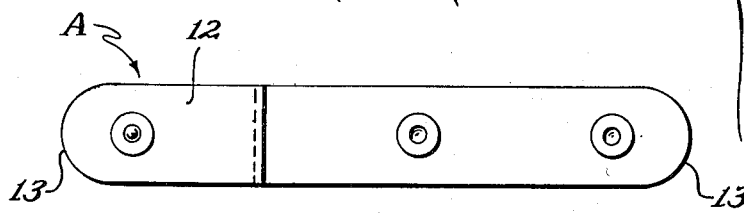
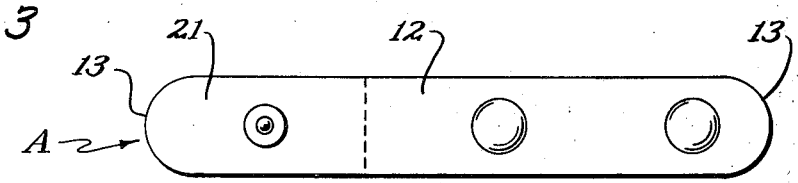
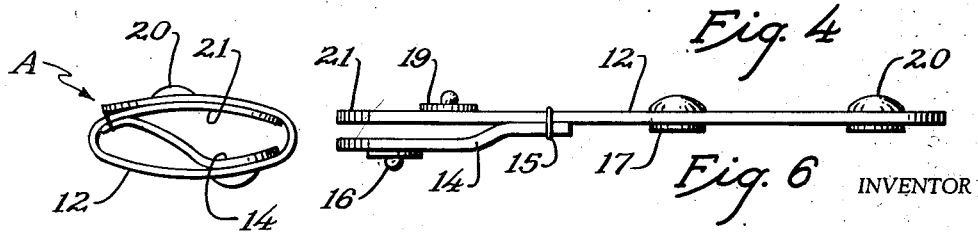
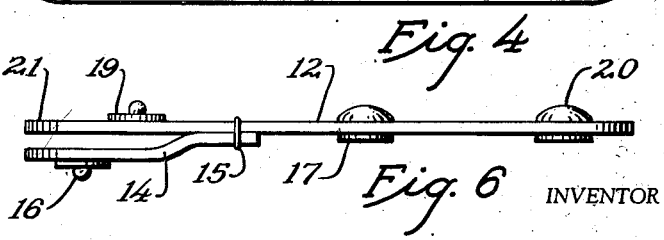
INVENTOR
Ethel Shelton Dunning
BY Robert M. Dunning
ATTORNEY Patented Dec. 1, 1953

2,660,731

UNITED STATES PATENT OFFICE 2,660,731

SCARF FASTENER

Ethel Shelton Dunning, St. Paul, Minn.

Application February 6, 1950, Serial No. 142,688

5 Claims. (Cl. 2—323)

My invention relates to an improvement in scarf fastener wherein it is desired to provide a simple and attractive device for fastening a scarf or similar article in place.

Scarves of a type used as head covering are in common use. These scarves are usually fastened in place by knotting the scarf beneath the chin of the wearer. This knotting of the scarf wrinkles and bunches up the end of the scarf and often makes the scarf unsightly in appearance. Furthermore, the constant knotting and unknotting of the scarf ends soon wears the scarf out at these points. It is the general purpose of the present invention to provide a device which will render unnecessary the constant tying and untying of the scarf.

A feature of the present invention lies in the provision of a simple fastener which serves to connect the ends of a scarf or similar article. This fastener is extremely simple in form, but is provided with two different compartments, each of which is designed to accommodate a corresponding end of the scarf. As a result the fastener may remain attached to one end of the scarf after it has been removed from the other end thereof.

A feature of the present invention resides in the provision of a fastener which may remain attached to one end of a scarf and may be quickly secured to the second end thereof when desired. Thus the fastener is always in position for use, and at the same time the fastener is properly located so that it will hold the scarf ends engaged when the scarf is again fastened. In other words, once the fastener is in its proper location, one end of the scarf may be disengaged therefrom when the scarf is taken off. When the scarf is again placed over the head the fastener is at the proper location to again secure the ends together.

A feature of the present invention lies in its simplicity and inexpensiveness. The device comprises merely a strip of flexible material, such as tape, leather, elastic, flexible plastic, or other suitable material. Thus the fastener may be made and produced at an extremely low price.

These and other objects and novel features of my invention will be more clearly and fully set forth in the following specification and claims.

In the drawings forming a part of my specification:

Figure 1 is a perspective view of a scarf in place showing the fastener in use for fastening the ends thereof.

Figure 2 is a perspective view of one end of the scarf showing the manner in which the fastener remains attached to the scarf and even after the other end of the scarf has been disengaged.

Figure 3 is a plan view of one side of the fastener showing the arrangement of parts thereupon.

Figure 4 is a plan view of the opposite surface of the fastener from that illustrated in Figure 3.

Figure 5 is a plan view of the fastener in scarf engaging position.

Figure 6 is an edge elevational view of the fastener in unfolded form.

The fastener A is designed for use in securing the ends 10 and 11 of a scarf B connected. The scarves B worn are usually rectangular or square in shape so that the ends 10 and 11 are actually diagonally opposite corners of the rectangle. The scarves are often folded diagonally and placed over the head with the folded edge directed forwardly. Thus folded diagonal opposite corners of the scarf are drawn beneath the chin and knotted or tied to hold the scarf in place. It is this knotting or tying which may be eliminated with my fastener A.

The fastener A comprises an elongated flat strip of elastic, tape, or other suitable material, such as leather or flexible plastic. The strip 12 is provided with square or rounded ends 13, depending upon the material used and the design desired. A second short strip 14 overlies one end of the strip 12 and is secured thereto in any suitable manner as by a transverse row of stitching 15. Thus one end of the strip is double and the portion of the strip 14 secured to the strip 12 is spaced substantially from the free outer ends of the strips 12 and 14.

Snap fasteners are provided for holding the strip 12 in properly folded relation. Two such fasteners are employed. One snap fastener is provided with one cooperable fastener portion 16 secured to the strip 14 near the outer free end thereof. The projecting portion of the fastener element 16 faces outwardly away from the strips 14 and 12. The second cooperable portion of the snap fastener is indicated by the numeral 17. This fastener portion 17 forms a socket into which the projecting element of the fastener portion 16 is engageable. Obviously the location of the two fastener portions may be reversed if desired.

A second snap fastener is provided with one portion 19 thereof secured to the strip 12 between the point of attachment 15 with the strip 14 and the adjacent free end of the strip 12. The fastener 19 is arranged with its projected portion directed outwardly from the strips 12 and 14 in a direction opposite to the direction in which the projection 16 extends.

The cooperable portion of the snap fastener element is indicated at 20 and is secured to the strip 12 near the opposite free end of this strip. This socket portion 20 is arranged with the socket directed in the same direction as the socket 17. Thus while the cooperable fastener portions 16 and 19 are oppositely directed, the fastener portions 17 and 20 are directed in the same direction.

The fastener A is fastened in the manner best illustrated in Figures 2 and 5 of the drawings. One end 10 of the scarf A is engaged between the strip 12 and the strip 14 when the fastener portions 16 and 17 are engaged. In other words, the strip 12 is held adjacent the end 10 of the scarf and the strip 14 is wrapped around the scarf end 10 so that the fastener portions 16 and 17 may be snapped together. This section anchors the fastener to the scarf end 10.

The fastener is now in the position illustrated in Figure 2 of the drawings. In order to complete the scarf fastening operation the end 11 of the scarf is engaged between the ends 12 of the strip, or in other words, the strip 12 is merely wrapped about the end 11 of the scarf so that the end 21 of the strip which is overlying the strip 14 extends about the scarf end. The snap fastener portions 19 and 20 may then be engaged to hold the fastener encircling both ends of the scarf.

It will be noted that the fastener A may be disengaged from the scarf end 11 by merely disengaging the snap fastener portions 19 and 20 while leaving the snap fastener portions 16 and 17 snapped together. When thus arranged the fastener A remains attached to the scarf end 10 so that it is in proper location to again engage the scarf end 11 when the scarf is again placed over the head.

The fastener illustrated is shown as having rounded ends. This form of construction is particularly adaptable for use with fasteners made of plastic, leather, or other suitable material. If desired the fastener may be made with binding at its ends which bind the strip and provide a finished appearance thereto. Such a structure is particularly useful when the fastener is made of tape or elastic of any type. The fastener may be made in various colors in various combinations of colors so as to fit the color scheme of the scarf or of other articles of clothing being worn. Similarly the outer surface of the fastener may be decorated by means of a broach or pin, or other suitable decoration. The fastener is shown in its simplest form for the purpose of illustration.

In accordance with the patent statutes, I have described the principles of construction and operation of my scarf fastener, and while I have endeavored to set forth the best embodiment thereof, I desire to have it understood that obvious changes may be made within the scope of the following claims without departing from the spirit of my invention.

I claim:

1. A scarf fastener including an elongated strip of flat flexible material, a second strip of flexible material secured to the first strip intermediate the ends thereof to overlie one of the ends of the first strip, separable fastener portions on both of the overlying strip ends, said fastener portions being directed in opposite directions, and cooperable fastener portions in longitudinally spaced relation on the first mentioned strip and spaced from said separable fastener portions, said cooperable portions being directed in the same direction.

2. The structure described in claim 1 in which the cooperable fastener portion for the fastener portion on the second strip is located near the center of the first strip and the other two fastener portions on the first strip are arranged near opposite ends of said strip.

3. A scarf fastener comprising an elongated strip of flexible material having a second strip secured thereto intermediate the ends thereof to provide parallel contacting strip ends, two pairs of cooperable separable fasteners secured to said strips, one of said pairs of fasteners having one cooperable part on said second strip directed away from the first strip and the other pair of said cooperable separable fasteners having one cooperable portion thereof on the other of said contacting strip ends and directed away from the second strip, and the remaining portions of said cooperable separable fasteners being longitudinally spaced on the first mentioned strip near the opposite end thereof.

4. The structure described in claim 3 in which the remaining cooperable portions of the separable fasteners are both directed in a similar direction.

5. A scarf fastener comprising an elongated strip of flexible material folded with its ends in overlapping relation, a separable fastener connected to said strip for fastening the strip ends in overlapping relation, a second strip of shorter length than the first strip secured to the inner surface of the first strip at a point intermediate the ends thereof and nearer one end than the other, and a separable fastener connecting the free end of said second strip to the inner surface of the first strip at a point spaced from the point of attachment between said strips toward the end of said first strip which is farther from said point of attachment.

ETHEL SHELTON DUNNING.

References Cited in the file of this patent

UNITED STATES PATENTS

| Number | Name | Date |
|---|---|---|
| 800,050 | Ayres | Sept. 19, 1905 |
| 1,510,388 | Darling | Sept. 30, 1924 |
| 2,247,835 | Gassert et al. | July 1, 1941 |